United States Patent [19]

Michel

[11] 4,121,437
[45] Oct. 24, 1978

[54] RING AND YOKE TYPE UNIVERSAL JOINT

[76] Inventor: Jean Louis Michel, 14, allee des Acacias, 78110 Le Vesinet; Paris, France

[21] Appl. No.: 776,188

[22] Filed: Mar. 10, 1977

[30] Foreign Application Priority Data

Mar. 12, 1976 [FR] France ............................. 76 07270
Jan. 13, 1977 [FR] France ............................. 77 00937

[51] Int. Cl.² ............................................. F16D 3/26
[52] U.S. Cl. ................................. 64/17 R; 64/17 A
[58] Field of Search ..................... 64/17 R, 17 A, 6

[56] References Cited

U.S. PATENT DOCUMENTS

| 3,136,141 | 6/1964 | Fisher | 64/8 |
| 3,651,663 | 3/1972 | Lange | 64/17 A |
| 3,733,668 | 5/1973 | Lange | 29/149.5 |
| 3,788,100 | 1/1974 | Pitner | 64/17 A |

FOREIGN PATENT DOCUMENTS

| 1,687,689 | 8/1953 | Fed. Rep. of Germany. |
| 441,138 | 5/1912 | France. |
| 1,528,756 | 5/1968 | France. |
| 1,538,608 | 7/1968 | France. |
| 2,176,214 | 10/1973 | France. |
| 2,231,261 | 12/1974 | France. |
| 574,556 | 1/1946 | United Kingdom. |
| 944,695 | 12/1963 | United Kingdom ................. 64/17 R |

Primary Examiner—Edgar W. Geoghegan
Attorney, Agent, or Firm—Stevens, Davis, Miller & Mosher

[57] ABSTRACT

A universal joint system having an annulus, two forks each having pivots journalled in bearings engaged in housings in the annulus, with elastic elements for filtering or damping radial or axial vibrations between two rotating shafts, those elements covering the pivots and being arranged for deflection by shoulder portions of the joint members, the elastic elements comprising a ring coaxial with an external ring of the bearing and having at least one radial and one axial abutment.

27 Claims, 12 Drawing Figures

RING AND YOKE TYPE UNIVERSAL JOINT

The present invention concerns an universal joint with annulus comprising two forks which are integral respectively with driving and driven elements, each provided with two concurrent pivots without a common point, that is to say without a spider, journalled in bearings engaged in housings formed in said annulus, said universal joint allowing an elastic connection to be formed which has variable torsional rigidity values and limited angular deflection under torsion, "limited angular deflection under torsion" being intended to refer to limited relative rotational movements of the two shafts about their respective axes, whatever the angle formed by these axes, between two shafts in rotational movement, and comprising elastic elements for the axial and/or radial filtering, i.e., damping, of vibrations, said elements having different rigidities.

The apparatus according to the invention makes it possible to connect together two shafts and/or transmission elements, whatever the speed at which the connection is used, simply by means of an annulus-type universal joint with filtering elastic elements integrated with the joint itself, without using dynamic balancing of the annulus and without even adding an additional elastic element for filtering vibrations. Likewise, in the case of a transmission assembly comprising in series at least two universal joints and a filtering elastic element, the integration of the filtering elastic elements with the universal joint according to the invention obviates the disalignmwent and the hunting of the rotating transmission elements.

For this purpose, the invention is characterized in that the elastic elements for radial and/or axial filtration of vibrations are of the type involving radial and/or axial deflections limited by means of radial and/or axial shoulders forming positive mechanical abutments, that they cover the pivots integral with the forks and/or the external rings of the bearings, and that in all cases each radial and/or axial filtering elastic element mounted under tension, comprises a ring coaxial with an external ring of the bearing with at least one radial abutment directed towards the axis of the bearing and at least one axial abutment, said ring thus constituting a pre-regulated axial and radial deflection limiting means. In order to ensure rigid connections on the pivot and/or the annulus, the transverse section of the coaxial ring of the filtering elastic element covering the pivot is slightly less than that of the pivot before its tight fitting over said pivot, whereas the transverse section of the coaxial ring of the filtering elastic element covering the external ring of the bearing is greater than that of its corresponding housing in the annulus before it is introduced therein.

In other constructional forms, the combination of radial and/or axial filtering elastic elements integrated with the universal joint, covering either the pivot or the external ring of bearing of the said universal joint, can be dissociated into filtering elastic elements which are used radially and/or axially.

Whatever the constructional form, the filtering elastic elements integrated with the universal joint are elastic elements interposed radially and/or axially about the pivots and bearings, between the pivots and the annulus, the profiled filtering elastic elements being made of materials selected from the group of materials constituted by elastomers and elastic metals.

In one constructional form, the radial filtering elastic element covering the pivot constitutes the internal ring of the bearing, the axial filtering elastic element covering the pivot constituting the elastic cap of the internal ring of the bearing.

In one constructional form, the elastic profiled cap is integrated with the filtering elastic element covering the external ring of the bearing.

In one constructional form, the elastic profiled cap is in one piece with the filtering elastic element covering the external ring of the bearing.

In one constructional form, the elastic profiled cap is integrated with the internal ring of the bearing.

In one constructional form, the elastic profiled cap is in one piece with the internal ring of the bearing.

Whatever the aforesaid constructional forms the profiled elastic cap is substantially offset with its axis relatively to the journalling axis of the bearing. In all cases, the profiled elastic cap has a concave and convex outline relative to the center of the universal joint. It comprises a cylindrical-ogival profile, which may or may not be truncated, ovoid with a truncated base, or in the form of a truncated pyramid with a base in the form of a regular polygon, curved, convex and/or concave. The cap comprises relief contact surfaces limited to punctiform and/or linear bearing surfaces, to limit contact friction at the side opposite from the center of the universal joint, at the end of the pivots of the bearings. The openings formed between the punctiform and/or linear bearing surfaces of the reliefs of the elastic cap are conduits for the flow of lubricant contained in the reserve of the bearing pivot, towards the journalling elements of this bearing. On the other hand the linear and/or punctiform bearing surfaces of the reliefs of the elastic cap are in contact at the side opposite from the center of the universal joint with the end of the external ring of the bearing or with the reliefs of the internal periphery of the holding sheath surrounding the annulus.

The reliefs of the elastic cap are provided with at least one axial limiting means used for the axial centering of the pivots of the forks of the universal joint in the annulus. The axial limiting means also leaves free the ends of the journalling elements of the bearing, which are journalled without or through the agency of mobile elements.

The internal dimension between the axial bearing faces of the mobile elements of the bearing at the two ends of the external ring and opposite the ends of these mobile elements is greater than or equal to their radial bulk dimension, the mobile elements being comprised between the tracks of the external ring of the bearing and its internal ring.

Radial projecting deformations within the internal ring, positive mechanical abutments, form radial shoulders and co-operate with a circular shoulder and/or groove which may be continuous or discontinuous, formed in the pivot in order to render the internal ring axially integral with the pivot in a relative position, which forms the necessary clearance for the deflection of the elastic cap at the end of the internal ring, at the side opposite from the center of the universal joint, either between the apex of the pivot and the bottom of the external ring of the bearing, or between the apex of the pivot and the bottom of the radial elastic element fixed in the ring or between the summit of the pivot and the internal face, directed towards the center of the universal joint, of the holding sheath surrounding the annulus. Furthermore, the combination of the radial abutment in relief projecting within the internal ring with the groove and/or grooves and/or the circular shoulder and/or shoulders, which may be continuous or discontinuous, of the pivot in accordance with their relative axial position on the journalling axes of the bearings, co-operate with the centering of the elastic caps of the four pivots of the same universal joint relatively to the center of the said joint in the three aforesaid cases. The collar of the internal ring at the universal joint center side, carries and positions the sealing element of the mobile elements of the bearing relatively to its bearing face, on the periphery of the external ring of the bearing, or relatively to its bearing face on the periphery of the filtering elastic element covering the bearing. The distance comprised between the axial abutment or abutments incorporated in the elastic cap of the internal ring at the side opposite from the center of the universal joint, and the collar of the said ring, supporting the sealing element of the mobile elements of the bearing, at the universal joint center side, will be determined in such a manner as to create a sufficient stress on the sealing element to ensure effective sealing-tightness for the mobile elements of the bearing and consequently will reduce to the minimum the axial stresses of the sealing element. The design of the said internal ring of the bearing reduces to the minimum the axial stresses of the sealing element. The design of said internal ring of the bearing reduces to the minimum the journalling torque of the rotating universal joint when transmitting a torque. The internal ring of the bearing before assembly on a pivot of the universal joint is prismatic with a polygonal base, the length of the apothems of this base being less than half the diameter of the pivot. The apexes of the said polygonal base are arcs of a circle the radii of which are greater than half the diameter of the pivot. By elastic deformation when it is assembled on the pivot, the internal ring is positioned thereon without requiring adjustment of great precision. The internal ring tends towards the cylindrical shape without necessarily achieving it, widened portions remaining on its periphery and creating narrowing effects on the circulation clearance and they compress the mobile elements of the bearing in the radial direction. This permanent preloading of the mobile elements of the bearing eliminates noises and rattling, hammering and whining, due to the play of the mobile elements of the bearings of the universal joint when vibrations are stimulated in them. It is of course apparent that the amount of the remaining widened portions constituting the radial elastic element of the internal ring of the bearing after assembly on its pivot should have a radial deflection limited by the radial shoulder or shoulders projecting within the internal ring of the bearing co-operating with the groove or grooves and/or the circular shoulder or shoulders, which may or may not be continuous, of the pivot in such a manner that said bearing pivots without functional play and with a slight radial preloading of the mobile elements of the bearing. The encircling hoop formed by the internal ring of the bearing fitted on the pivot has the object of reinforcing said pivot and giving it rigidity. In this way, with the same bulk as compared with a conventional universal joint, the universal joint proposed by the present invention has a much higher capacity to transmit torque. The small thickness and the considerable surface hardness of the internal ring, which are indispensable for journalling of the mobile elements of the bearing, by this encircling material on the pivot in one piece with the fork, as compared with a conventional universal joint, makes it worthwhile to produce pivot-fork assemblies in large series by using materials which are extremely machinable, with large manufacturing tolerances, without long and tricky heat treatments, and therefore without supplementary machining operations for dealing with geometric irregularities and deformations of the pivot-fork assemblies resulting from such treatment, while ensuring good mechanical fatigue strength for the universal joint. Whatever the constructional form of the universal joint, the pivot is made of materials selected from the group of materials constituted by plastics materials and metals.

In another constructional form, the pivot of the bearing is in one piece with the fork arm.

In another constructional form, the pivot is fitted onto the fork arm.

Whatever the constructional form of the pivot, a stiffening web between the arms of the forks connects them to one another. A recess at each side of this web is situated on the path of deflection of the end of the opposite fork. A clearance is provided on the external profile of the arms of the forks remote from the universal joint center.

Drawing out the metal of the stiffening web and the external profile of the fork arms of the universal joint is obtained by upsetting the metal. This stiffening web connects the arms of the forks to the fixing hub integral with the transmission shaft.

The hub for fixing the fork on the transmission shaft is divided radially and perpendicularly relatively to the journalling axis of the forks. This hub comprises two lugs in which there is provided a bore for receiving a fixing element. The bore of the fixing hub of the fork, which may or may not be blind, is provided with splines.

In another constructional form, this fixing hub is a solid of revolution, hollow, closed, blind or not, and may be smooth and/or provided with splines. In the case of a smooth hub, fixing the fork on the transmission shaft, said shaft has at least three corrugations which are slightly conical in shape relative to the transmission shaft, and are equidistant, distributed over the periphery at angles of 120°, with a material swelling in the vicinity of the corrugation.

In another constructional form the hub for fixing the fork on the transmission shaft is in one piece with said shaft.

The introduction of the forks of the universal joint into the annulus is effected by swinging these in a plane containing the axis of pivoting of the bearings and the axis of the hub for fixing the forks on the transmission shaft. The annulus of the universal joint has axial and/or radial openings in the path of travel of the arms of the forks, and they thus facilitate such introduction, and on the other hand permit the maximum deflection of the forks in the annulus during operation. Housings in the annulus receive the bearings with or without a filtering elastic element, through the exterior of this annulus.

In another constructional form of the universal joint, the periphery of the annulus is encircled by a holding sheath.

In another constructional form of the universal joint, an optimum result is obtained by the combination of radial and elastic filtering elastic elements described hereinbefore integrated in the said joint.

The invention will be readily understood by reading the following description given with reference to the accompanying drawings which represent constructional forms of the annulus-type universal joint according to the present invention.

As shown in FIGS. 4, 7, 8 and 9, the universal joint comprises filtering elastic elements 1, 3 covering the pivot 5 within the external ring 14 of the bearing 7, closed by a radial shoulder 32, these being interposed between the ring 15 and the pivot 5 of the bearings 7 integral with the arms 33 of the fork 21 shown in FIGS. 1 to 9.

The filtering-action elastic elements 2, 4 covering the external ring 14 of the bearing 7, are provided with a ring 49 coaxial with the bearing 7 provided with an abutment 50. The coaxial ring 49 is introduced by way of the exterior into the housing 48 of the annulus 15. The filtering elastic element 2, 4 covering the external ring 14 of the bearing 7 is a profiled element provided with the abutment 50 constituting a means for limiting the radial deflection movement integrated with the profiled filtering elastic element 2, 4. The filtering elastic elements 1, 3 covering the pivot 5 are interposed between the free end 9 of the pivots 5 in FIGS. 2, 3, 4, 5, 6, 7, 8, 9, 11, 12 and the ring 15. The axial filtering elastic element 3 covering the pivot 5 is an elastic cap 8 made in one piece with the internal ring 6 of the bearing 7. The shape of the cap 8 is concave and convex and its linear bearing portions 12 leave clearances 16 for the flow of lubricant from the reserve 17 of the pivot 5 of the bearing 7 to the mobile elements 18 for the journalling of the bearing 7. The projecting elastic cap 8 is in contact with the internal face 20 of the base 13 of the external ring 14 of the bearing 7. Each elastic cap 8 is provided with axial deflection limiting means 19 and a radial deflection limiting means 27. The four elastic caps 8 of the same universal joint effect axial centering of the pivots 5 of the arms 33 of the forks in the annulus 15 by means of radial deformations 23 co-operating with grooves and shoulders 22 of said pivot. Furthermore the axial deflection limiting means 19 leaves free the ends 30 of the mobile elements 18 provided for allowing pivoting of the bearing 7 and the base 13 of the external ring 14. The axial bulk dimension of the axial clearance 29 at the end of the mobile elements 18 for the journalling of the bearing 7 is equal to the radial bulk dimension of the mobile elements 18 comprised between the internal journalling track 10 and external track 11 of the external ring 14 of the bearing 7 and the internal ring 6 of the bearing 7.

Figure 1:
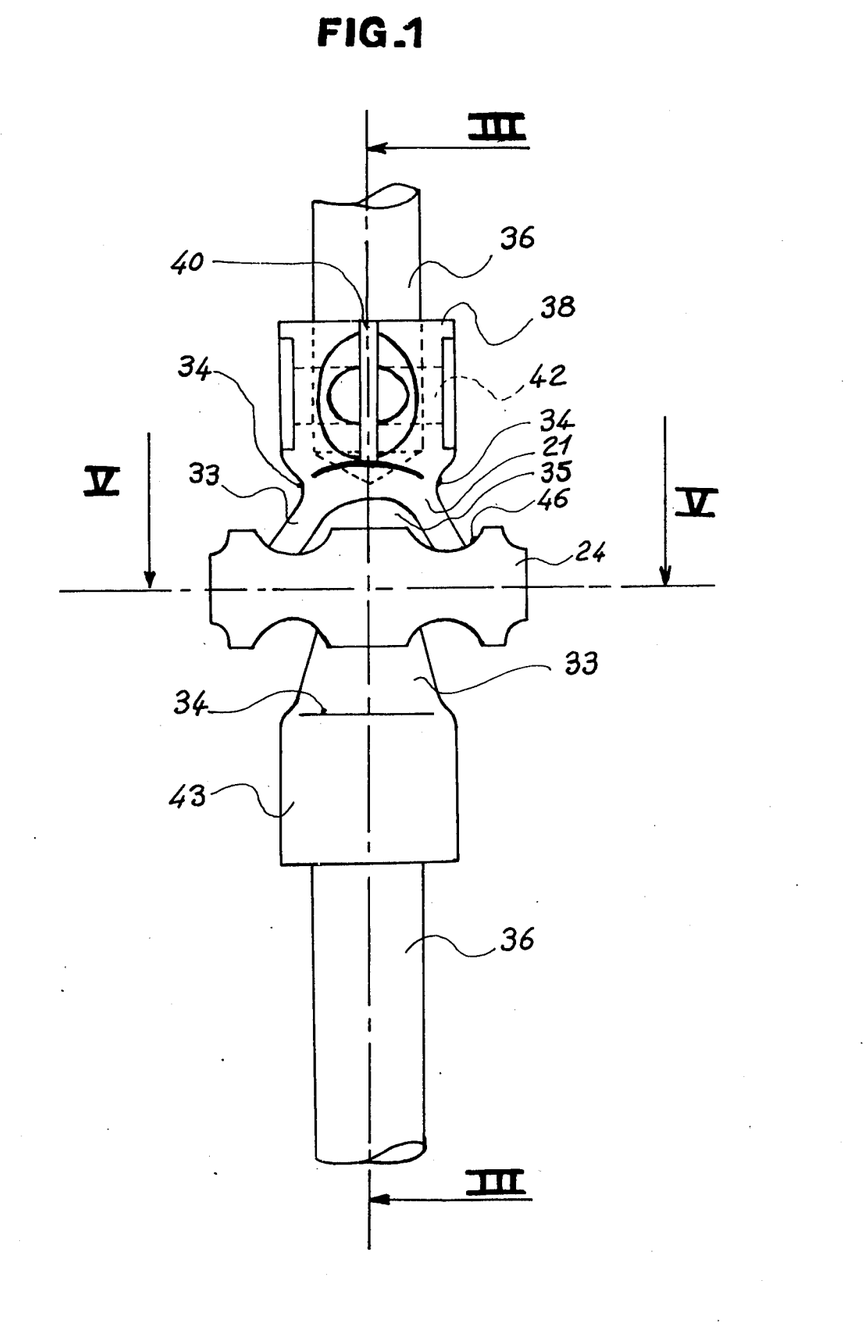
FIGS. 1 and 2 are views in perspective of the filtering elastic element universal joint with annulus.
Figure 2:
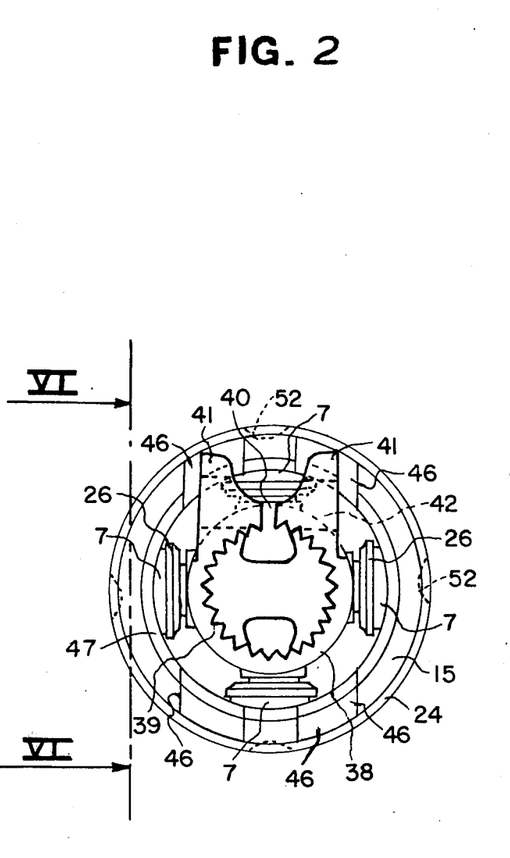
Figure 3:
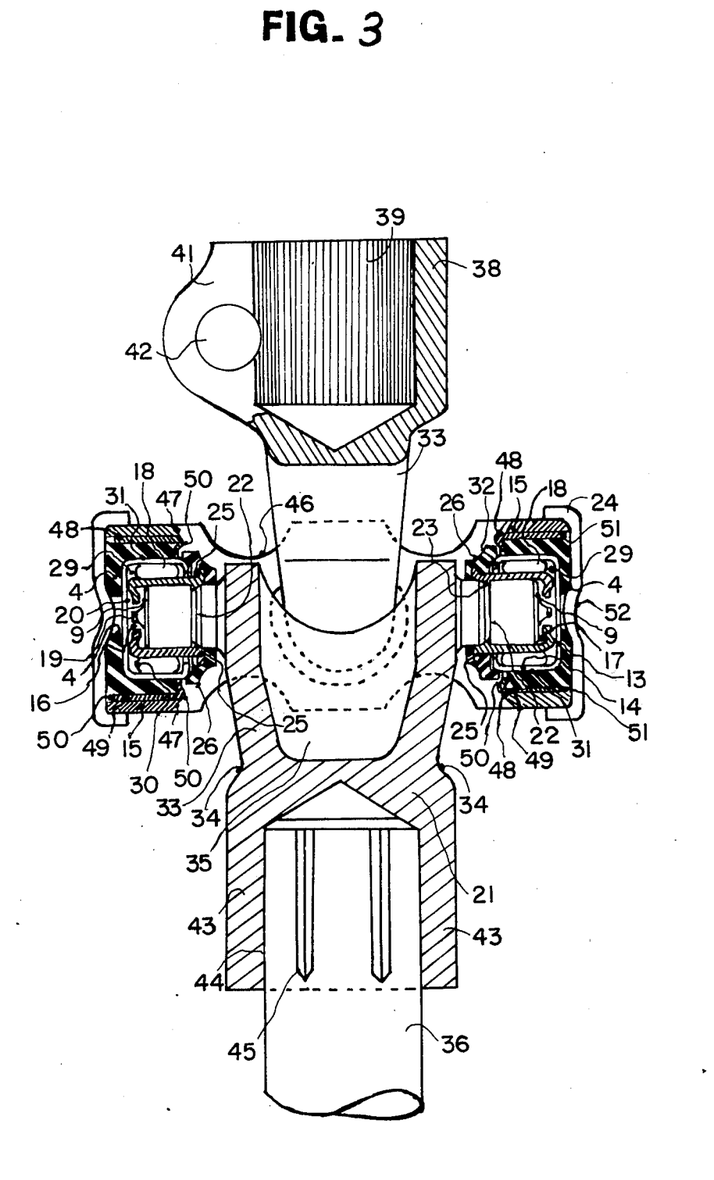
FIG. 3 shows a view in section taken on the line III—III of FIG. 1.
Figure 4:
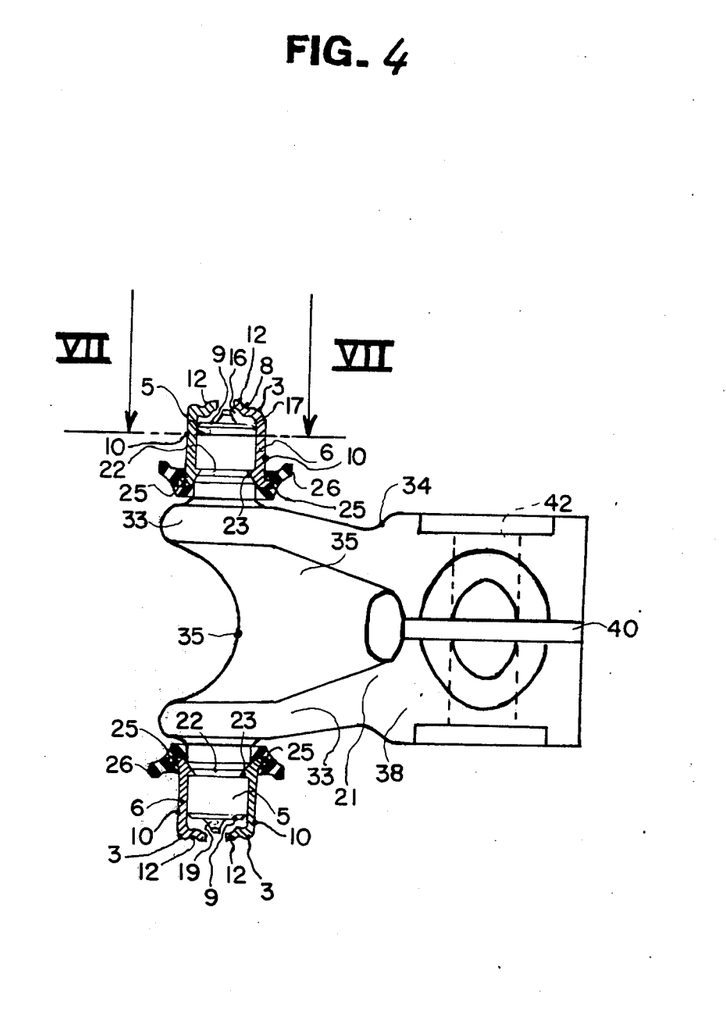
FIG. 4 shows one of the forks of the universal joint with the internal rings of the bearings in diametral section.
Figure 5:
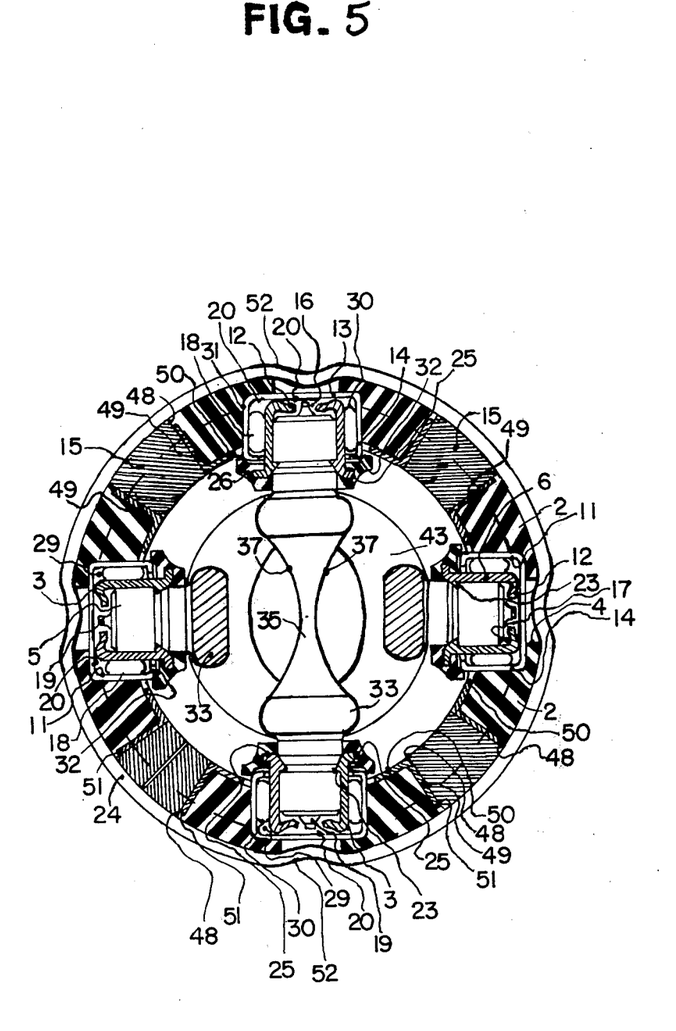
FIG. 5 shows a partial view on a larger scale of the section on the line V—V of FIG. 1.
Figure 6:
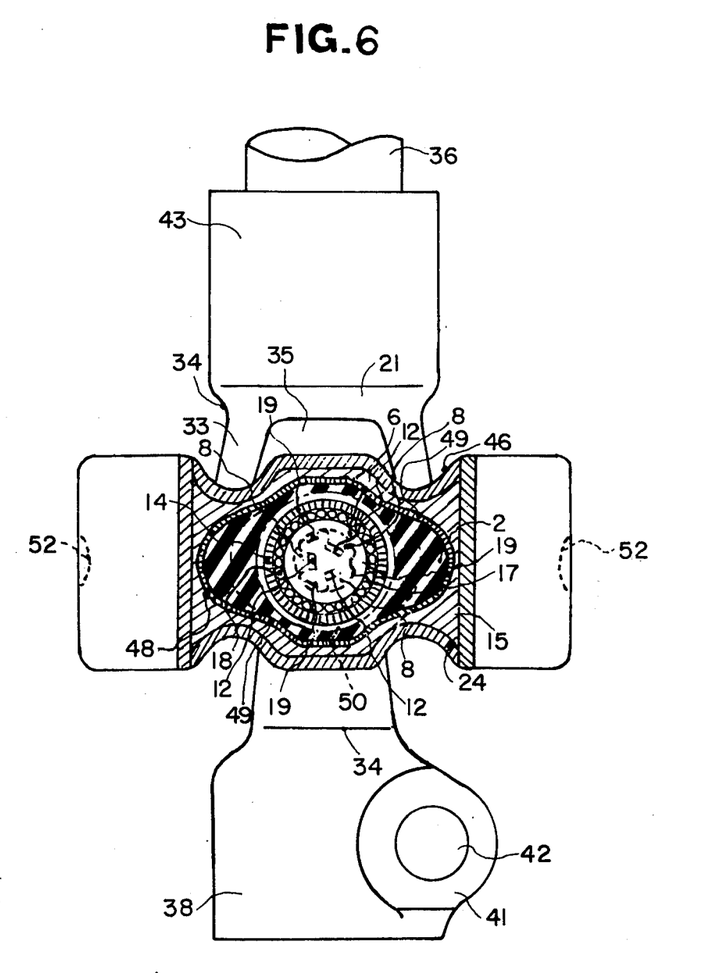
FIG. 6 shows a partial view of the section taken on the line VI—VI of FIG. 2.
Figure 7:
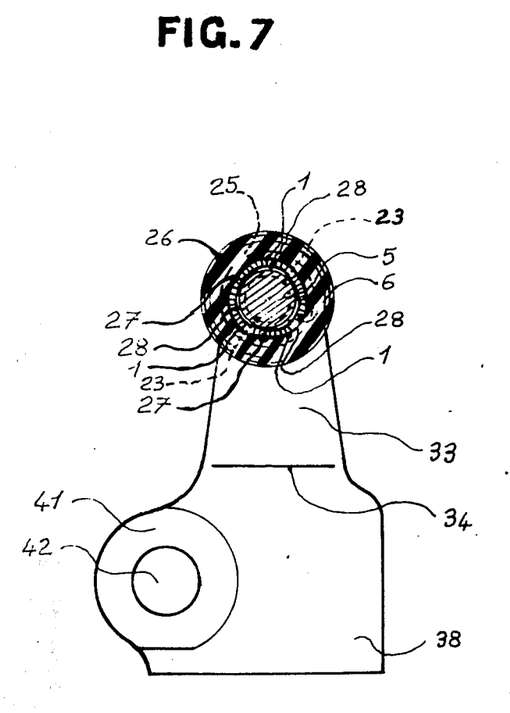
FIG. 7 shows a partial view of the section taken on the line VII—VII of FIG. 4.
Figure 8:
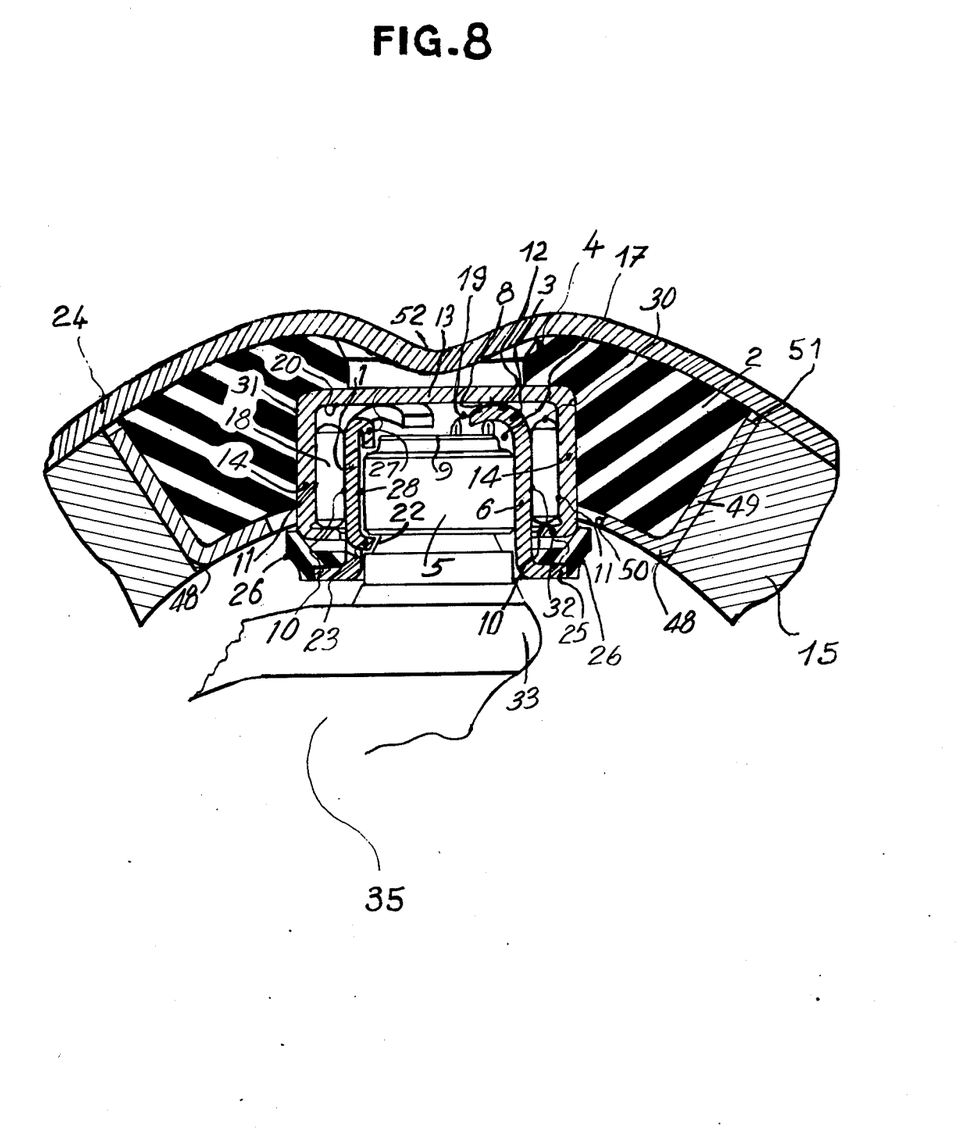
FIG. 8 shows a view in section on a larger scale of the bearings shown in FIG. 3, 5 and 6.
Figure 9:
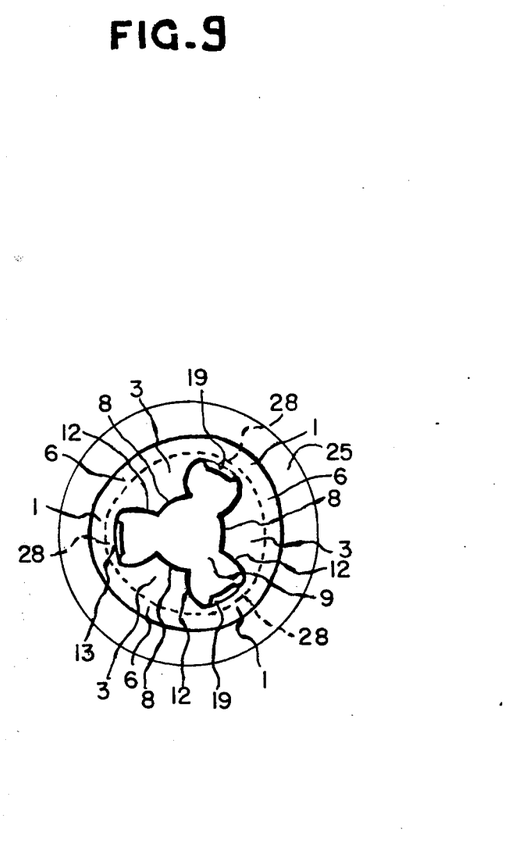
FIG. 9 is a view from above in the axial direction on a larger scale of the internal ring shown in FIGS. 3 to 8.

The internal ring 6 in FIGS. 1, 2, 3, 4, 5, 6, 7, 8, 9, 11, 12 has at least three outwardly directed swellings 28 in FIGS. 7, 8, 9 and a collar 25 on which there is fixed a sealing element 26 bearing on the periphery 31 of the external ring 14 of the bearing 7 (FIGS. 2 to 9).

The pivot 5 in FIGS. 4, 5, 7, 8 is in one piece with the arm 33 of the fork 21. The arms 33 of the fork 21 are connected to one another by a stiffening web 35. The stiffening web 35 comprises an opening 37 situated in the path of travel of the deflection of the opposite fork 21. A clearance 34 is provided on the external profile of the arms 33 of the forks 21. The hub 38 for fixing the fork 21 comprising splines 39 on the transmission shaft 36 in FIGS. 1 to 8 is divided radially at 40 and comprises two lugs 41 formed with a bore 42 for receiving a fixing element. The bore of the fixing hub 38 in FIGS. 1, 2, 3, 4, 6, 7 is a blind hole provided with splines 39. The second fork 21 of the universal joint has a hollow cylindrical hub 43 closed with a blind bore 44 fixed rigidly on a transmission shaft with splines 45 (FIGS. 1 to 6).

The annulus 15 of the universal joint comprises axial openings 46 and radial openings 47 in FIGS. 1, 2, 3, 5, 6, 8, 11, 12 in the path of travel of the arms 33 of the forks 21, permitting the maximum deflection thereof.

The periphery of the annulus 15 is encircled by a holding ring or sheath 24. Axial deflection limiting means of the filtering elastic elements 2, 4 covering the external rings 14 of the bearings 7 are formed by the four depressions 52 forming shoulders 64 of linear bearing surfaces situated in the holding sheath 24 encircling the annulus 15. The external diameter of each depression 52 is smaller than the external diameter of the external ring 14 of the bearing 7, and it co-operates with the axial deflection limiting means of the coaxial ring 49 (FIGS. 1, 2, 3, 5, 6, 8, 10, 11, 12).

Figure 10:
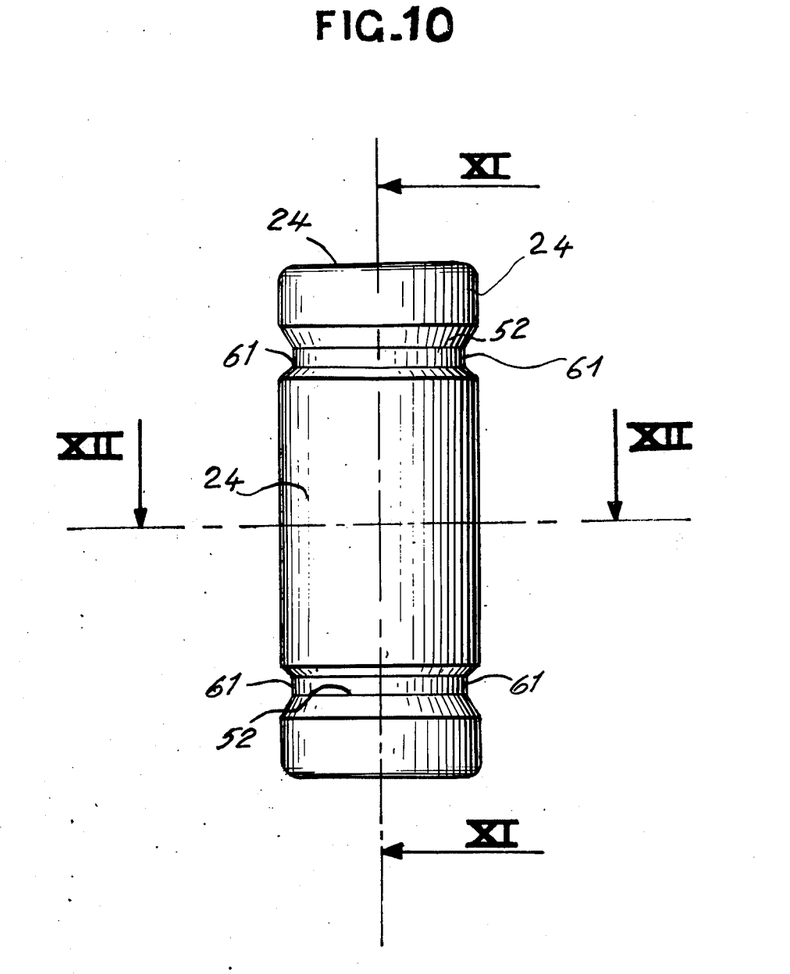
FIG. 10 shows a modified form of the universal joint with an external view of the elastic envelope encircled by its metal holding sheath.
Figure 11:
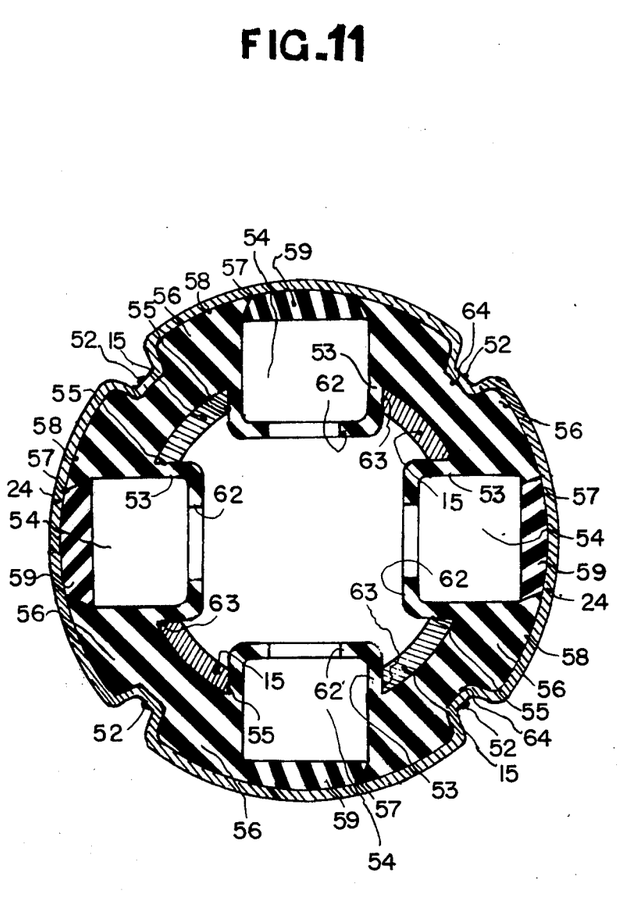
FIG. 11 shows a view in section taken on the plane XI—XI of FIG. 10 of the elastic envelope encircled with its metal holding sheath.
Figure 12:
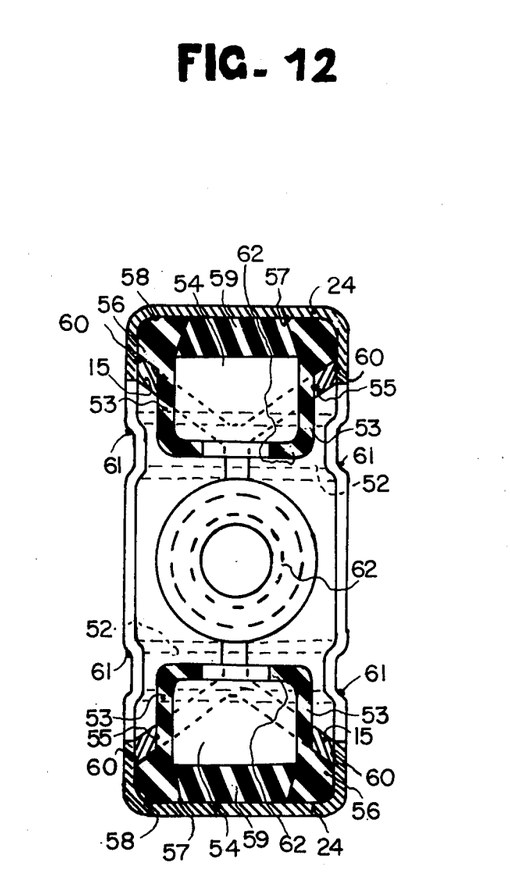
FIG. 12 shows a view in section taken on the plane XII—XII of FIG. 10 of the elastic element encircled with its metal holding sheath.

According to a variant shown in FIGS. 10 to 12, the radial and axial filtering elements comprise radial sleeves 53 made of elastomeric material serving as a housing 54 for the bearings 7 and extending through the four orifices 55 forming radial shoulders 63 formed radially with angular intervals of 90 degrees in the annulus 15, these sleeves 53 projecting in the central space of the annulus 15 and being integral with an envelope 56 of elastomeric material covering at least the peripheral surface of the annulus 15, while the apertures 57 of the sleeves 53 opening into the external face 58 of the envelope 56 are closed by closure plugs 59.

The envelope 56 may also extend over the lateral annular faces 60 of the annulus 15.

The assembly of the various parts of the annulus may be also reinforced by the rigid holding sheath 24 fixed rigidly on the annulus 15 by crimping as shown at 61. The said sheath then surrounds contiguously the periphery and the annular side faces 60 of the annulus 15 covered with the elastomeric envelope 56.

Preferably the envelope 56 and at least a portion of the external surface of the sleeves 53 adhere to the annulus 15.

This envelope 56 and the sleeves 53 may advantageously form a single element over which radial sealing elements 62 are molded for protecting the bearings 7.

The molded elastic envelope is made in one piece to the final dimensions and does not require any further machining.

The elastic envelope is made to adhere to its metal frame forming a one-piece assembly of very good mechanical strength for transmitting considerable torques.

The elastic envelope is constituted by a deformable elastic flexible elastomer, and with the quality of the equipment used the assembly of the universal joint is considerably simplified.

The elastic envelope by its design, enclosed in the rigid holding sheath which is a metal sheath for example, is given a maximum elastomer volume for a minimum universal joint bulk and therefore there is a considerable increase in the efficiency with which vibrations are damped, these being absorbed for the greater part.

The elastic envelope by its design makes it possible to obtain different radial and axial rigidities in compression about the bearings to improve the precision with which the driving and driven shafts are driven about their respective axes whatever the angle formed by these axes, closing the apertures of the sleeves situated at the external face of the said elastic envelope by plugs made of materials of possibly different rigidity to the rigidity of the said elastic envelope.

The envelope may extend over the annular lateral faces of the annulus.

The envelope and at least part of the external surface of the sleeves adhere to the annulus, this envelope and said sleeves possibly forming advantageously a single element moulded on to the annulus.

The annulus-type filtering elastic universal joint with limited deflection can be used in all cases where the driving transmission element or shaft is not to create or transmit vibrations or shock to the driven transmission element or shaft, and particularly when it is necessary to obtain equal or slightly progressive forces during the rotation of the driving transmission element or shaft.

The universal joint of the present invention can advantageously replace the conventional universal joint in remote control systems because of its smaller bulk with higher capacity, its absence of parasitic frictional torque in the journalling elements of the bearings and consequently its greater efficiency.

Particularly advantageous uses can be made in laboratory machines and apparatus, and in industrial and domestic machines and apparatus.

The invention is very advantageously useful in steering parts in motor vehicles or the like.

Of course the invention is in no way limited to the constructional forms described and illustrated here, which have been given only by way of example.

The invention comprises all technical equivalents for the means described, and also combinations thereof if these are made in accordance with the spirit of the invention and carried out within the framework of the following claims.

I claim:

1. Universal joint with annulus comprising two forks provided each with two pivots journalled in bearings engaged in housings formed in the said annulus, it being possible to produce with this universal joint an elastic connection having variable torsional rigidities and limited angular deflections under torsion, between two rotating shafts, and comprising elastic elements for the radial and/or axial filtration of vibrations, characterised in that the said elements are arranged for radial and/or axial deflection limited by means of radial and/or axial shoulders forming positive mechanical abutments, that they cover the pivots integral with the forks and/or an external ring of the bearing, and that in all cases the said radial and/or axial filtering elastic elements comprise a ring coaxial with the external ring of the bearing with at least one radial abutment and/or directed towards the axis of each bearing and at least one axial abutment, the said coaxial ring thus constituting a preregulated radial and axial deflection limiting means.

2. Universal joint according to claim 1, wherein the radial and/or axial filtering elastic elements are made of materials selected from a group of elastic-behaviour materials which is constituted by elastomers and elastic metals.

3. Universal joint according to claim 2, wherein the radial and/or axial filtering elastic element covering the pivot forms a profiled elastic cap at the free end of the pivot and is used as a track for mobile journalling elements such as balls, needle rollers or other rollers, or a self-lubricating intermediate ring, constituting an internal ring of the bearing.

4. Universal joint according to claim 3, wherein the profiled elastic cap substantially offset relatively to a pivoting movement axis of the bearing has a relief of concave and convex form relatively to the center of the universal joint, the profile of the said elastic cap being cylindrical-ogival, truncated or non-truncated, ovoid with a truncated base or in the form of a truncated pyramid with a regular polygon base, curved, convex and/or concave.

5. Universal joint according to claim 3, wherein the profiled elastic cap comprises relief contact surfaces limited to linear and/or punctiform bearing surfaces co-operating with an end forming a partially closed base of the external ring of the bearing at the side opposite from the center of the universal joint, and/or with the annulus.

6. Universal joint according to claim 5, wherein characterised in that spaces formed between the punctiform and/or linear bearing surfaces of the elastic cap constitute passages for the flow of lubricant contained in a reserve situated at the end of the pivot of the bearing towards the mobile elements provided for journalling purposes such as balls, needle rollers or other rollers, or a self-lubricating intermediate ring of the said bearing.

7. Universal joint according to claim 5, wherein an axial abutment at least per elastic cap withdrawn relatively to an internal face of the end of the external ring of the bearing opposite from the center of the universal joint, incorporated in the relief surfaces of the elastic cap, regulates in limiting the amplitude of the elastic axial deflection of the said cap so that the elastic caps of the same universal joint have identical elastic deflections and have a centering effect on the forks of the said joint relatively to the said annulus.

8. Universal joint according to claim 5, wherein, a groove at least and/or a shoulder circular and continuous or discontinuous are formed in the pivots and co-operate axially with radial relief deformations projecting at the interior of the internal coaxial ring of the bearing, and in this way define the necessary free space for the axial deflection of the elastic cap between the apex of the pivot and the internal face nearest to the universal joint center either of the base of the external ring of the bearing or the base formed by the axial filtering elastic element of the radial elastic element fixed in the annulus or the internal face nearest the center of the universal joint, of a sheath encircling the annulus.

9. Universal joint according to claim 3, wherein a centering element of the elastic caps of the same universal joint centers the said elastic caps of the internal coaxial rings of the bearings relatively to the center of the said universal joint, the said centering element is constituted by radial projecting deformations within the internal ring of the bearing, assembled in the circular continuous or discontinuous grooves and/or shoulders of the pivot, the displacement of the assembly of the said radial projecting deformations and the grooves and/or shoulders on the pivoting axes of the bearings co-operate in the centering of the elastic caps relatively to the center of the universal joint.

10. Universal joint according to claim 3, wherein a supporting collar at least situated at the end of the internal coaxial ring of the bearing adjacent the universal joint center carries and positions a sealing element of the mobile journalling elements of the bearing relatively to its face bearing on the periphery of the external ring of the bearing and/or on the periphery of the elastic element covering the external ring of the bearing.

11. Universal joint according to claim 10, wherein a rigid spacer element formed by the body of the internal ring of the bearing comprised between the supporting collar for the sealing element of the journalling mobile elements of the bearing nearest the universal joint center, and the axial abutment or abutments of the elastic cap, remote from the center of the universal joint, of the internal ring of the bearing, avoids excessive preloading of the sealing element.

12. Universal joint according to claim 8, wherein the internal ring of the bearing substantially prismatic in form, has a polygonal base whose sides have a length of apothems less than half the diameter of the pivot and apexes forming arcs of a circle with radii greater than the half-diameter of the pivot, the said arcs of circles provided with radial deflection limiting means, and the sides co-operating with the radial deformations limit the radial deflection of the elastic element covering the pivot.

13. Universal joint according to claim 3, wherein elastic elements for radial deformation of the internal coaxial ring, after its assembly on the pivot, achieved by a radial elastic deformation of the said ring, produce swellings on the periphery of the internal ring of the bearing, the said swellings narrowing the circulation clearance for the mobile journalling elements of the bearing, compressing the said mobile journalling elements radially in the bore of the external ring of the bearing and consequently the mobile elements of the said bearing move pivotably without functional play and with a slight preloading.

14. Universal joint according to claim 7, wherein an axial clearance opposite the ends of the mobile journalling elements of the bearing is formed by the dimension difference between the bearing faces forming axial end guiding of the ends of the mobile elements, of the two ends of the external ring of the said bearing and the axial bulk dimension of the said mobile elements, the said axial clearance being greater than or equal to the dimension of the radial bulk of the said mobile elements comprised between the running track of the external ring of the bearing and the track of the internal coaxial ring of the said bearing.

15. Universal joint according to claim 3, wherein an encircling hoop formed by the internal coaxial ring of the bearing constitutes an element for reinforcing the said pivot and giving it rigidity, having a sufficient thickness, surface hardness and surface condition for forming by itself the track for the mobile elements of the said bearing.

16. Universal joint according to claim 1, wherein the internal coaxial ring of the bearing covers the pivot and is made of a material selected from the group of materials constituted by plastics materials and metals, either fitted on to the arm of the fork of made in one piece with the said arm, comprising in both cases a clearance formed on its external profile remote from the center of the universal joint.

17. Universal joint according to claim 1, wherein a stiffening web connects on the one hand arms of each fork to one another and on the other hand a hub for fixing the said fork on a transmission shaft, the said stiffening web comprises recesses at each side which are situated on a path of deflection travel of the arms of the opposite fork.

18. Universal joint according to claim 1, a fixing hub of the fork for fixing on a transmission shaft, blind or otherwise, smooth or provided with splines, is divided radially and perpendicularly relatively to pivoting axes of the forks and comprises two lugs, a bore being provided in the said lugs for receiving a fixing element.

19. Universal joint according to claim 7, wherein a hub for fixing the fork on a transmission shaft is either made in one piece with the said shaft or is a body of revolution, hollow, closed, blind or otherwise, with a splined and/or smooth bore fixed on said transmission shaft comprising at least three corrugations which are slightly conical in shape relatively to the transmission axis, these being equidistantly distributed over the circumference at angles of 120° with a material swelling in the vicinity of the corrugations.

20. Universal joint according to claim 1, wherein axial openings of the annulus and/or of a holding sheath and/or radial openings of the annulus in a path of travel of arms of the forks co-operate on the one hand in the introduction of the said arms of the forks in the annulus of the universal joint by the swinging of the said forks in a plane containing the pivoting axis of the bearings and axis of the hubs for fixing the forks on the transmission shaft, and on the other hand in the deflection of the forks in the annulus.

21. Universal joint according to claim 1, wherein the housings of the annulus receive bearings of the universal joint, the said housings and/or the periphery of the said annulus which may or may not be encircled with a holding sheath receive the filtering elastic elements covering the external rings of the said bearings.

22. Universal joint according to claim 8, wherein the coaxial ring integrated with the filtering elastic element covering the external ring of a bearing of the universal joint, has a radial shoulder directed towards the pivoting axis of the bearing, the said radial shoulder limits the radial deflection of the said filtering elastic element, bearing on the periphery of the external ring and/or on the periphery of the pivot of the said bearing, the axial deflection of the filtering elastic element is limited by the end, remote from the center of the universal joint, of the coaxial ring bearing within the holding sheath, by at least four depressions forming shoulders of linear bearing surfaces in the sheath encircling the annulus and bearing on the base of the external ring and/or the free end of the pivot.

23. Universal joint according to claim 1, wherein the radial and axial filtration elements comprise radial sleeves made of an elastomeric material used as a housing for the bearings and extending through the orifices forming radial shoulders provided radially at angular intervals of 90° in the annulus, the said sleeves projecting within the annulus and being integral with an envelope of elastomeric material surrounding at least the peripheral surface of the annulus, whilst the apertures of the sleeves opening into the external face of the said envelope are closed by closure plugs.

24. Universal joint according to claim 23, wherein the envelope extends over annular lateral faces of the annulus.

25. Universal joint according to claim 24, wherein a rigid sheath integral with the annulus by means of at least four crimpings, surrounds contiguously the periphery and the annular lateral faces of the annulus covered with the envelope.

26. Universal joint according to claim 23, wherein the envelope and at least some of the external surface of the sleeves adhere to the annulus.

27. Universal joint according to claim 23, wherein the envelope and the sleeves form a single moulded-over unit with radial sealing elements which ensure protection of the bearings.

* * * * *